2 Sheets—Sheet 1.

R. H. LONG.

Dummy Engine.

No. 1,253.

Reissued Jan. 7, 1862.

Witnesses:

J. W. Coombs

Geo. Reede.

Inventor:

R. H. Long per Munn & Co.

AM. PHOTO-LITHO. CO. N.Y. (OSBORNE'S PROCESS.)

2 Sheets—Sheet 2.

R. H. LONG.

Dummy Engine.

No. 1,253.

Reissued Jan. 7, 1862.

Witnesses:

J. W. Coombs

Geo Reede

Inventor:

R. H. Long per Munn & Co.

AM. PHOTO-LITHO. CO. N.Y. (OSBORNE'S PROCESS.)

UNITED STATES PATENT OFFICE.

ROBERT H. LONG, OF PHILADELPHIA, PENNSYLVANIA.

IMPROVED ARRANGEMENT OF STEAM-ENGINES FOR PROPELLING STREET PASSENGER-CARS.

Specification forming part of Letters Patent No. 26,911, dated January 24, 1860; Reissue No. 1,125, dated January 15, 1861; Reissue No. 1,253, dated January 7, 1862.

*To all whom it may concern:*

Be it known that I, ROBERT H. LONG, of the city and county of Philadelphia, and State of Pennsylvania, have invented a new and useful Improvement in the Mode of Propelling Railway-Cars by Steam, which improvement is also applicable to the propulsion of carriages by steam on common roads; and I do hereby declare that the following is a full, clear, and exact description of the same, reference being had to the accompanying drawings, forming part of this specification, in which—

Figure 1:
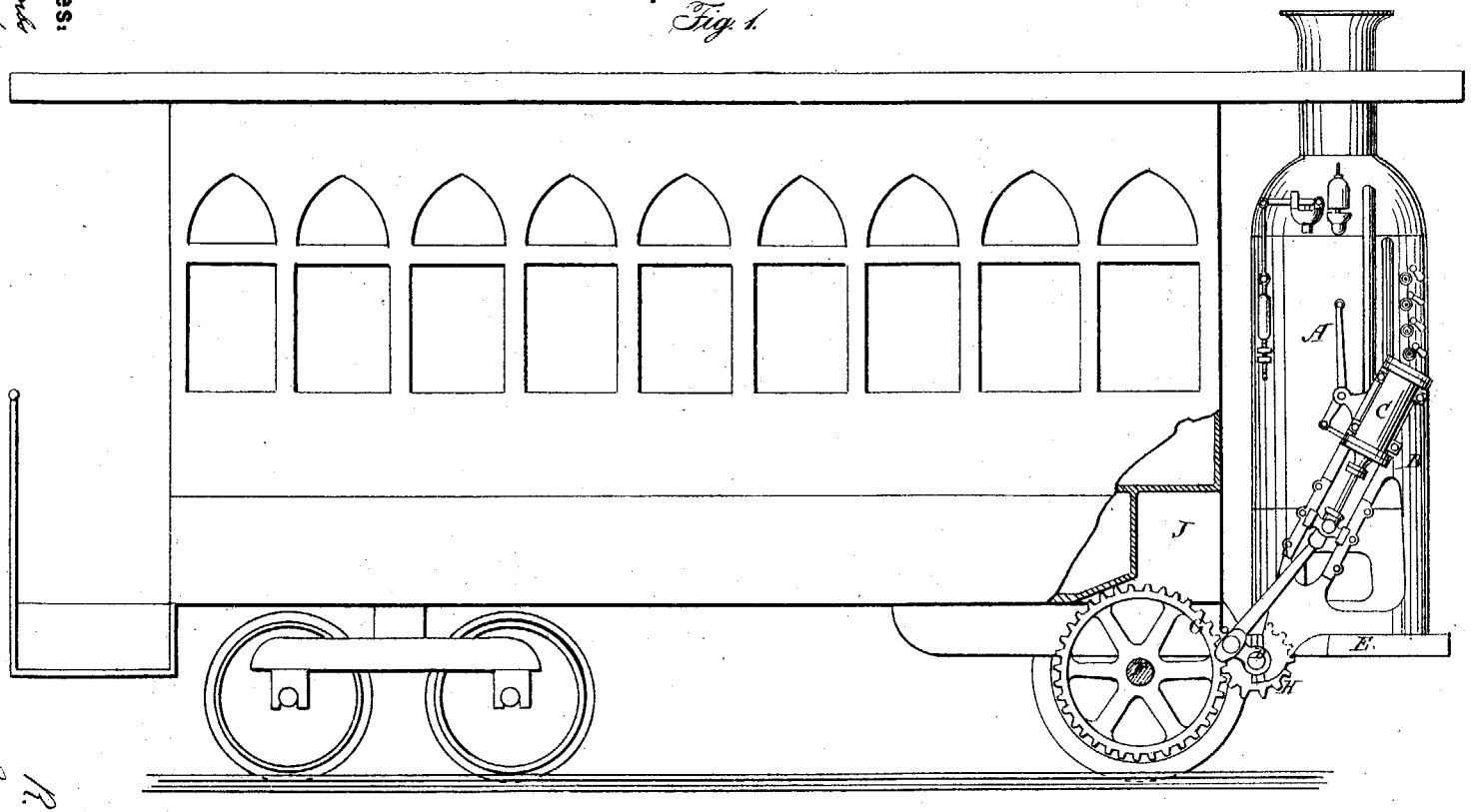
Figure 2:
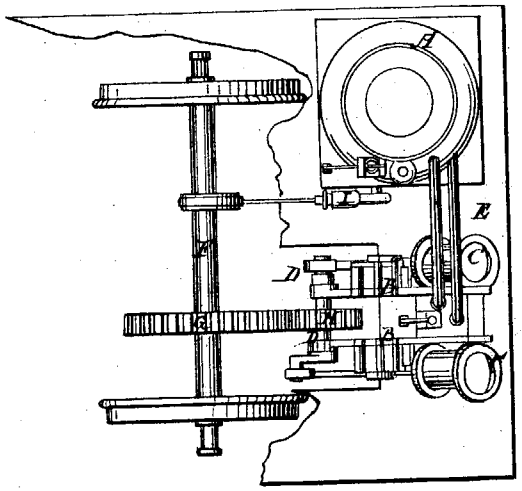
Figure 3:
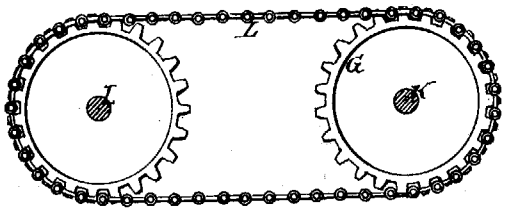

Figure 1 is a side view of a railway-car having my improvement applied. Fig. 2 is a plan showing the arrangement of the engine and boiler upon the platform of the car. Fig. 3 exhibits a modification of the connection of the engine with the driving-axle of the car.

Similar letters of reference indicate corresponding parts in the several figures.

This invention is adapted to railroads in all cases in which a separate locomotive, from its size, would be objectionable; also to the propulsion of carriages on common roads.

It consists in the arrangement of the engine and boiler side by side upon one platform of the car or carriage, as hereinafter described, by which the room for passengers is not decreased, while ample room may be afforded for the engineer upon the platform, with all parts of the engine under his immediate view and control.

A is the boiler, and B C D the engine, arranged side by side on the platform E, which is supposed to be the forward one, as that is to be preferred.

I is the pump, arranged between the engine and boiler and attached to the latter.

J is the water-tank, placed in the front part of the car, and so arranged as to form an additional seat. This might, however, be placed under the seats, as now arranged.

F is the forward axle, furnished with a cog-wheel, G, which is geared with a pinion, H, on the crank-shaft D of the engine, the said pinion and wheel transmitting the power of the engine to said axle, and so effecting the propulsion of the car.

Instead of the cog-wheel G being placed upon one of the car-axles, it may be on a separate shaft, K, as shown in Fig. 3, and the motion transmitted to the axle F by means of an endless chain, L, passing over another cog-wheel on the forward axle. This arrangement of the engine and boiler upon the platform, besides economizing room and bringing all parts of the engine under the control and view of the engineer, affords especial facility for using a small engine running at a very high velocity and geared with the driving-axle of the car or carriage, as it permits the arrangement of the driving-pinion H of the engine with its axis in the same horizontal plane as the axis of the driving-axle, and the cog-wheel provided thereon for the said pinion to work in, by which arrangement the jolting of the car is prevented from materially changing the distance between said axis and bringing the wheel and pinion out of gear or too deeply in gear, and also prevented from breaking the connections of or otherwise injuring the engine.

What I claim as my invention, and desire to secure by Letters Patent, is—

The arrangement of the steam-engine and boiler relatively to each other and upon the platform of a railway-car or other carriage, substantially in the manner herein specified.

Witnesses: ROBT. H. LONG.

I. M. FOLTZ,

GEORGE BUTLER.